W. GODDU.
ATTACHMENT FOR LATHES.
APPLICATION FILED JUNE 19, 1916.

1,206,528. Patented Nov. 28, 1916.

Inventor
William Goddu
By Jas. H. Churchill
Attorney

THE NORRIS PETERS CO., PHOTO-LITHO., WASHINGTON, D. C.

UNITED STATES PATENT OFFICE.

WILLIAM GODDU, OF WINCHESTER, MASSACHUSETTS.

ATTACHMENT FOR LATHES.

1,206,528. Specification of Letters Patent. Patented Nov. 28, 1916.

Application filed June 19, 1916. Serial No. 104,362.

*To all whom it may concern:*

Be it known that I, WILLIAM GODDU, a citizen of the United States, and a resident of Winchester, in the county of Middlesex and State of Massachusetts, have invented an Improvement in Attachments for Lathes, of which the following description, in connection with the accompanying drawings, is a specification, like characters on the drawings representing like parts.

This invention relates to lathes and more particularly to an attachment for lathes of ordinary construction, whereby the latter are enabled to perform work of various kinds; that is, straight or irregular work. To this end, the attachment is provided with a stationary member, which has provision for being mounted on the center point or spindle and firmly secured thereto, and a movable tool-carrying member which is mounted to move on the said stationary member, and has provision for attachment to the tool post of the ordinary lathe, so as to move therewith in the direction of the length of the work, and said movable member is provided with a tool holder, which is capable of being moved on the tool-carrying member transversely with relation to the work, by a pattern secured to the said stationary member. The pattern referred to may be a plate or bar, which is of the shape it is desired to impart to the work, and it is detachably secured to the stationary member so as to enable other patterns of different shapes to be employed if desired. These and other features of this invention will be pointed out in the claims at the end of this specification.

Figure 1:
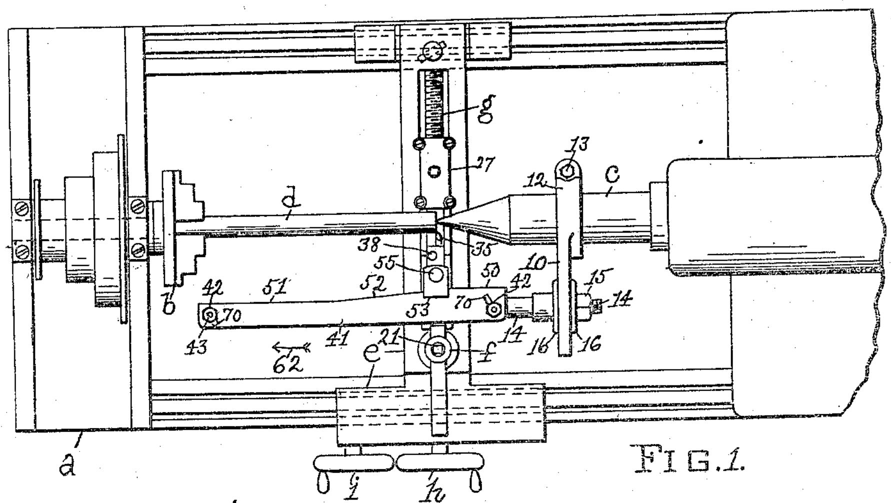
Figures 2, 3:
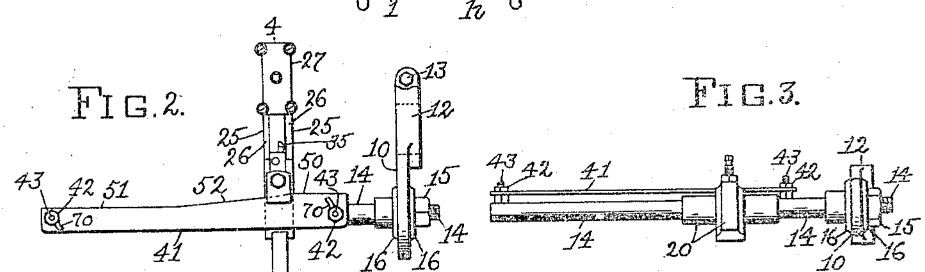
Figures 4, 6:
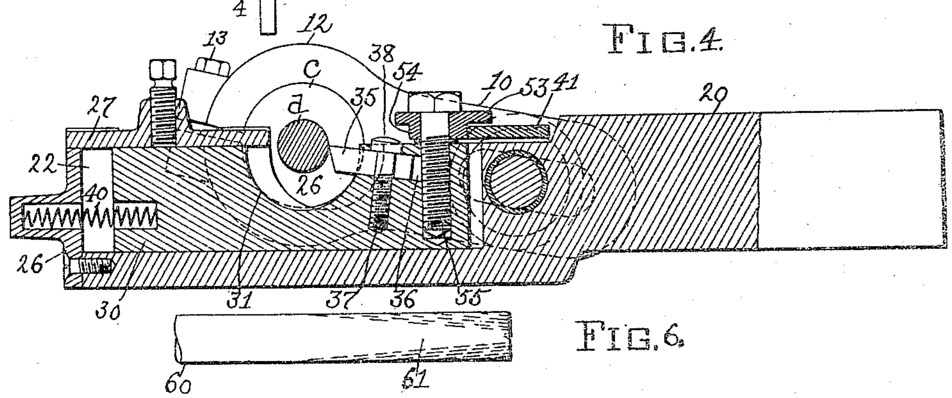
Figure 5:
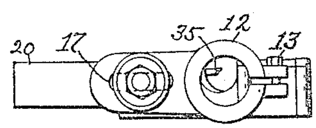

Figure 1 is a plan view of a sufficient portion of an ordinary lathe provided with an attachment embodying the invention to enable it to be understood. Fig. 2, a plan of the attachment removed from the lathe. Fig. 3, a front elevation of the attachment shown in Fig. 2. Fig. 4, a section on an enlarged scale, taken on the line 4—4, Fig. 2. Fig. 5, an end elevation of the attachment looking toward the left in Fig. 2, and Fig. 6, a detail to represent the character of the work performed on the lathe shown in Fig. 1.

Referring to the drawing, *a* represents a lathe of ordinary construction, such as now commonly found in machine shops, and which is provided with a chuck *b* and spindle *c* to hold and center the work *d*, and with a carriage *e* movable longitudinally of the lathe and provided with a tool post *f*, which is movable on the carriage *e* by means of the screw rod *g* provided with the hand wheel *h*. The carriage *e* is moved longitudinally of the lathe by means of the hand wheel *i* in a manner well understood. The parts of the lathe as thus far described are of well-known construction, and the lathe is usually provided with a cutting tool, not shown, but which is inserted through a slot in the tool post *f* and firmly secured to the latter.

With the lathe of ordinary construction and as thus far described, one class of work can be performed; that is, a straight cut can be made in the work which is parallel with the spindle *c* and the longitudinal center of the work.

The present invention has for its object to provide lathes of the character described with means for enabling articles of different shapes to be made on the lathe. To this end, the spindle *c* has mounted upon it an arm 10, which is firmly secured to the spindle, and in the present instance the arm 10 is provided with a split hub 12, which is slipped over the spindle and clamped thereon by the screw 13. The arm 10 has extended from it a rod 14, which is secured to the arm by the nut 15 and washers 16 (see Figs. 2 and 3), and said rod is capable of being moved with relation to the arm by means of a slot 17 in the arm, through which the end of the rod 14 is extended. The arm 10 and the rod 14 constitute what may be considered the stationary member of the attachment.

The rod 14 has mounted on it to slide thereon a movable tool carrying member, one form of which is herein shown and consists of a bar 20, which has its rear end of suitable size to be inserted into the slot in the tool post *f* and be firmly secured thereto by the screw 21, the same as the ordinary tool is secured in said post.

The bar 20 at its front end is slotted longitudinally to form a chamber 22 (see Fig. 4), having side walls 25 to which are removably secured an end plate 26 and a top plate 27. The top plate 27 extends but a portion of the length of the chamber 22, so as to leave a portion of the latter open at its top, and the side walls of the open portion of the chamber are provided with openings 26 through which the work *d* can extend, so as to allow the bar 20 to be moved lengthwise of the work.

The tool-carrying member 20 has located in the chamber 22 a tool holder in the form of a block 30, which is capable of moving in the chamber 22, and said block is provided with a concavity or recess 31, which coöperates with the openings 26 in the side walls 25 to afford a free passage for the work *d*.

The block 30 carries a tool 35 for acting on the work. The tool 35 may be of any suitable or usual construction and is represented as a cutting tool, which has its rear end inserted into a socket or opening 36 extended into the block 30 from the wall of the cavity 31. The tool 35 may be secured in its adjusted position in the socket 36 by a screw 37, whose head 38 is designed to engage the tool 35 and firmly clamp it in its socket against movement.

The tool holder 30 is movable in the chamber 22 transversely with relation to the work *d* and longitudinally of the carrier 20 for the tool holder 30, and such movement in one direction is effected by means of a spring 40 (see Fig. 4), and in the opposite direction by a pattern 41, which is shown in the present instance as a bar affixed to the rod 14 of the stationary member, by nuts 42 engaging threaded studs 43 extended from the said rod. The pattern 41 in the present instance is wider at one end than at the other, and the straight front edge of the wider portion, marked 50 in Fig. 2, is connected with the straight front edge of the narrower portion, marked 51, by an inclined edge, marked 52.

The front edge of the pattern bar 41 has coöperating with it a device, which is movable with the tool holder 30, said device being shown as a plate 53, which overlaps the pattern bar 41 and is provided with a hub 54, which engages the front edge of the pattern bar, and which is secured to the tool holder by the screw 55 (see Fig. 4). The hub 54 is kept in engagement with the front edge of the pattern bar 41 by the spring 40.

From the above description, it will be seen that as the tool-carrying member 20 is moved lengthwise of the pattern bar 41, the cutting tool 35 follows the contour of the pattern and shapes the work accordingly.

In the present instance, if the tool-carrying member 20 traveled the length of the particular pattern herein shown, the tool would cut the work so as to form straight surfaces connected by an intermediate inclined surface. In the present instance, it is designed to use only the inclined surface 52 and provide the work with a tapered end, as represented by dotted lines in Fig. 6, which arrangement is useful in providing tools, such as punches or sets with a cylindrical rear or body portion 60 and a tapered or conical end portion 61.

By reference to Fig. 1, it will be seen that if the carriage *e* is moved in the direction of the arrow 62, the tool 35 will effect a cut which inclines from the end of the work toward the outer surface thereof, and that by succeeding inclined cuts represented by the dotted lines of different length in Fig. 6, the work may be provided with a tapering or conical nose or end portion.

If it is desired to make a straight cut parallel with the axis of the spindle *c*, the carriage *e* is moved so as to bring the hub 54 into engagement with a straight portion of the pattern or the latter may be reversed on the rod 14 so as to present its straight rear edge to the hub 54.

The pattern bar 41 if desired may be provided with slots 70 to permit the pattern bar to be inclined with relation to the rod 14, so as to obtain with a single pattern bar tapers of different degrees.

I have herein shown one form of pattern, but it is not desired to limit the invention to the particular form herein shown or to the particular method of mounting the pattern on the stationary member.

Claims.

1. The combination with a lathe provided with a spindle and with a carriage having a tool post, of an attachment comprising a stationary member affixed to said spindle and provided with a pattern, and a movable member engaged with said tool post and movable on said stationary member and provided with a tool holder coöperating with said pattern and bodily movable on said movable member substantially at right angles to said spindle.

2. An attachment for lathes provided with carriages having tool posts, comprising a stationary member capable of being attached to the spindle of said lathe and provided with a pattern detachably secured to said stationary member to permit it to be removed from the latter without disturbing the relation of the stationary member to the said spindle, and a movable member capable of engaging the tool post of the lathe and provided with a tool holder movable on the stationary member and coöperating with said pattern.

3. An attachment for lathes comprising a stationary member capable of being affixed to a stationary part of the lathe and provided with a pattern detachably secured thereto, and a movable member comprising a tool carrying member mounted on said stationary member to move thereon with relation to said pattern.

4. An attachment for lathes comprising a stationary member and a movable member, said stationary member having an arm capable of being mounted on a spindle of the lathe, and a rod extended from said arm substantially at right angles thereto, and a pattern secured to said rod, said movable member having a bar mounted to slide on said rod and provided with a chamber, a tool holder movable in said chamber and provided with a device engaging said pattern, and yielding means acting on said holder to maintain said device in engagement with said pattern.

In testimony whereof, I have signed my name to this specification.

WILLIAM GODDU.

Copies of this patent may be obtained for five cents each, by addressing the "Commissioner of Patents, Washington, D. C."